(12) United States Patent
Laster et al.

(10) Patent No.: US 9,353,949 B2
(45) Date of Patent: May 31, 2016

(54) DEVICE FOR IMPROVED AIR AND FUEL DISTRIBUTION TO A COMBUSTOR

(75) Inventors: Walter R. Laster, Oviedo, FL (US); Reinhard Schilp, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1080 days.

(21) Appl. No.: 13/448,458

(22) Filed: Apr. 17, 2012

(65) Prior Publication Data

US 2015/0369135 A1    Dec. 24, 2015

(51) Int. Cl.
| | |
|---|---|
| *F23R 3/26* | (2006.01) |
| *F23R 3/14* | (2006.01) |
| *F02C 9/20* | (2006.01) |
| *F01D 17/14* | (2006.01) |
| *F01D 17/16* | (2006.01) |

(52) U.S. Cl.
CPC ............ *F23R 3/14* (2013.01); *F01D 17/141* (2013.01); *F01D 17/162* (2013.01); *F01D 17/165* (2013.01); *F02C 9/20* (2013.01); *F23R 3/26* (2013.01)

(58) Field of Classification Search
CPC ............ F23R 3/14; F23R 3/10; F23R 3/04; F23R 3/26; F02C 9/20; F01D 17/14; F01D 7/141; F16K 3/32
USPC ................ 60/39.23, 773, 751, 752
See application file for complete search history.

(56) References Cited

U.S. PATENT DOCUMENTS

| | | | |
|---|---|---|---|
| 2,227,666 A * | 1/1941 | Noack ............... | B01J 19/0053 122/24 |
| 3,879,939 A | 4/1975 | Markowski | |
| 4,049,021 A * | 9/1977 | Fromm ............... | F16K 3/32 137/625.31 |
| 4,100,733 A | 7/1978 | Striebel et al. | |
| 4,129,985 A | 12/1978 | Kajita et al. | |
| 4,900,246 A * | 2/1990 | Schirmer ............ | F23C 6/045 431/10 |
| 5,611,684 A | 3/1997 | Spielman | |
| 5,881,756 A | 3/1999 | Abbasi et al. | |
| 6,438,961 B2 | 8/2002 | Tuthill et al. | |
| 6,594,999 B2 | 7/2003 | Mandai et al. | |
| 7,574,865 B2 | 8/2009 | Bland | |
| 7,632,064 B2 | 12/2009 | Somanath et al. | |
| 7,721,547 B2 | 5/2010 | Bancalari et al. | |
| 7,762,074 B2 | 7/2010 | Bland et al. | |
| 7,810,336 B2 | 10/2010 | Moraes | |
| 7,841,180 B2 | 11/2010 | Kraemer et al. | |
| 2003/0058737 A1 | 3/2003 | Berry et al. | |
| 2008/0091379 A1 | 4/2008 | Lynch et al. | |
| 2008/0155987 A1 | 7/2008 | Amond et al. | |
| 2008/0267783 A1 | 10/2008 | Kraemer et al. | |
| 2009/0173074 A1 | 7/2009 | Johnson et al. | |
| 2010/0037617 A1 | 2/2010 | Charron et al. | |
| 2010/0077719 A1 | 4/2010 | Wilson et al. | |
| 2010/0162724 A1 * | 7/2010 | Myers ................ | F23N 5/00 60/794 |
| 2010/0218501 A1 | 9/2010 | York et al. | |
| 2010/0229556 A1 | 9/2010 | Dinu | |
| 2010/0275601 A1 | 11/2010 | Berry et al. | |
| 2011/0000215 A1 | 1/2011 | Lacy et al. | |
| 2011/0061389 A1 | 3/2011 | Zuo et al. | |

\* cited by examiner

*Primary Examiner* — Steven Sutherland

(57) ABSTRACT

A flow conditioning device (30, 50, 70, 100, 150) for a can annular gas turbine engine, including a plurality of flow elements (32, 34, 52, 54, 72, 74, 102) disposed in a compressed air flow path (42, 60, 80, 114, 122) leading to a combustor (12), configured such that relative adjustment of at least one flow directing element (32, 52, 72, 110) with respect to an adjacent flow directing element (34, 54, 74, 112, 120) during operation of the gas turbine engine is effective to adjust a level of choking of the compressed air flow path (42, 60, 80, 114, 122).

8 Claims, 6 Drawing Sheets

DEVICE FOR IMPROVED AIR AND FUEL DISTRIBUTION TO A COMBUSTOR

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to flow conditioning devices for a gas turbine engine. In particular, the invention relates to a flow conditioning device used to condition as well as to control an amount of a flow of compressed air delivered to a combustor head end in a can-annular gas turbine engine.

BACKGROUND OF THE INVENTION

In the design of an industrial can-annular gas turbine engine, a flow path from the compressor exit diffuser to the entrance of the combustor can be complex, as the flow must surround the combustor and turn before entering the combustion chamber. If the compressed air flow entering the combustor is not uniform, the performance of the combustor, as measured by NOx and CO emissions and combustion dynamics, may suffer. It is known to modify the flow entering the combustor to achieve a desired air flow profile at the entrance to the combustor. These flow conditioning devices vary in type and may be disposed in the compressed air flow upstream of an entry to the combustor.

Conventional flow conditioning devices may contain flow conditioning elements that condition the flow by imparting a swirl to a flow of compressed air in which the flow conditioning elements are disposed. In such a case the flow conditioning elements may be airfoils or similar devices. In another approach, a flow conditioning element may meter the flow of compressed air by offering a resistance to the flow such that compressed air backs up and spreads around the flow conditioning element. As a result, compressed air flow exiting the flow conditioning element is more uniform throughout its volume.

BRIEF DESCRIPTION OF THE DRAWINGS

The invention is explained in the following description in view of the drawings that show.

DETAILED DESCRIPTION OF THE INVENTION

Figure 1:
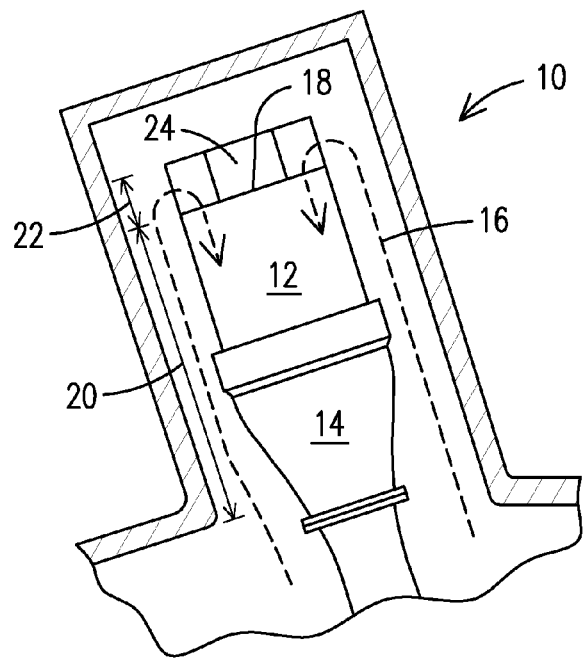
FIG. 1 shows a combustion system including a combustor and a transition.

The present inventors have recognized that flow conditioning devices can be utilized to provide multiple functions in addition to simply conditioning a flow of compressed air. Further, the inventors have recognized that each function can be provided independent of the other, and as a result, any combination of functions can occur at a given time. Specifically, in addition to properly conditioning a flow of compressed air for delivery to a head end of a combustor, a flow conditioning device can also be used to regulate a volume of the flow of compressed air, in response to various operating conditions, thereby providing an ability to control the gas turbine engine dynamics in a way not before possible. Further, the flow conditioning device can be used to provide a fuel injection stage upstream of the combustor head end.

Conventional fuel conditioning devices of the types that use a plate with openings provide uniformity of flow exiting the plate without imparting a swirl. Those that use airfoil elements impart a swirl in the flow of compressed air so that the flow becomes more uniform throughout its volume downstream of the airfoil elements. Both of these types of flow conditioning devices impede (choke) the flow of compressed air simply by their presence. As used herein a swirl is a ratio of circumferential movement to axial movement in a flow of compressed air.

The present inventors have recognized that if this choking effect could be selectively controlled through a flow conditioning device, then operation of the gas turbine engine could be further controlled, providing an advantage. One example of such an advantage could occur during part load operation of the gas turbine engine. Under such conditions, increasing a choking effect of compressed air enroute to a combustor head end could decrease an amount of compressed air that reaches the combustor head end. Compressed air choked from the combustor head end would simply be redirected through cooling air passages that take compressed air from the compressed air plenum and direct it to any of a number of points downstream of the combustion process. A decrease in an amount of compressed air that reaches the head end results in a richer fuel/air ratio. The richer fuel/air ratio in turn burns hotter and this may reduce CO emissions which may typically be increased during part load operation. This is a single example and not meant to be limiting. Any number of operational advantages may result from increased control of a choking effect of the compressed air flow.

In light of recognizing an advantage of being able to control a level of choking in the flow of compressed air, the inventors have devised unique but simple flow conditioning devices that enable choke control during operation of a gas turbine engine in which the flow conditioning device is disposed. Controlled choking of an airflow can be achieved in flow conditioning devices that use plates and those that use airfoils.

Flow conditioning devices that use plates may include two or more plates disposed adjacent to each other in a flow of compressed air such that the compressed air will first encounter an upstream plate and then a downstream plate. Each plate has at least one hole in it and the holes are associated with each other to produce a flow conditioning path through the plates. The number of holes may vary, and may include as few as one and as many as the plate will permit structurally. In the latter, the plate may resemble a screen due to the great number of holes. Any distribution of the openings throughout the plate is possible. Movement of one plate with respect to another will adjust a resistance of the flow conditioning device to the flow of compressed air there through. The movement may be rotation or translation of one, some, or all of the plates with respect to another plate. In embodiments having adjacent plates where openings align directly with other openings, such as holes, movement of one plate with respect to another will change a size of the opening such that less fluid can flow there through, which increases resistance to the flow. Such a change in size may be a reduction in a cross sectional area of the opening perpendicular to the flow. The amount of fluid flow possible may be represented in terms of a hydraulic diameter. Thus, relative adjustment of the plates may adjust a hydraulic diameter of individual flow conditioning paths, thereby adjusting a level of choking.

Various configurations of the plates are considered to accommodate various locations in the compressed air flow upstream of the combustor head end where the plate assemblies may be disposed. As the compressed air travels toward the combustor head end it flows in a direction opposite that of the flow of combustion gasses within the combustor and transition. As it reaches the inlet end of the combustor assembly, it turns to enter the combustor head end. Thus, locations appropriate for a flow condition include a region disposed upstream of a turning region, a turning region, and a region immediately adjacent a combustor head end inlet.

Flow conditioning devices may alternately be formed as airfoils disposed in an annular region disposed circumferentially about a longitudinal axis of a combustion assembly, which includes a combustor and a transition/duct between the combustor and a turbine. In conventional implementations, airfoils used as flow conditioners may be stationary. Individual airfoils may be positioned relative to an adjacent airfoil during initial installation of the gas turbine engine, but this is a manual tuning process and not an operational adjustment. In implementations where the airfoils are stationary, no adjustment of the choke during operation of the gas turbine engine is possible. In alternate implementations the airfoils may be collectively adjustable during operation. Such adjustment is the type where all of the airfoils rotate in unison. There is no adjustment of one airfoil relative to an adjacent airfoil during operation of the gas turbine engine. The inventors have recognized that a relationship exists such that increasing an angle with respect to an airflow axis of the airfoils necessarily increases both choking and swirl. Likewise, an opposite adjustment (straightening) of the airfoils decreases swirl and choking. It is not possible in these implementations for the flow conditioning devices to adjust a choking effect without adjusting a swirling effect.

In contrast to the prior art, an embodiment of the present invention allows at least one airfoil to be adjustable with respect to an adjacent airfoil during engine operation. This adjustment may be in an amount or direction of rotation of the airfoil when compared to that of an adjacent airfoil. This relative adjustment of as few as one airfoil and as many as all but one of the airfoils provides an operator with the ability to control the amount of choking in a manner that will have a different effect on the swirl than conventional airfoil configurations. For example, if a single airfoil is rotated then both flow conditioning paths defined by the single airfoil are changed. In one case an inlet to the flow conditioning path is increased and an outlet is decreased. In the other case the opposite happens, where the inlet to the flow conditioning path is decreased and the outlet is increased. This relative adjustment therefore changes a level of choke, and likely alters a level of swirl. However, the change in the level of swirl may be an increase or a decrease, depending on the direction of the rotation of the single airfoil. In the case of an increase in swirl, the change is still different from that of a uniformly adjusted set of airfoils because each flow conditioning path is changed when the airfoils move in unison, whereas in the instant invention the change in swirl is effected locally.

The inventors have also recognized that adjusting airfoils in a manner that provides a local variation in the airflow may be advantageous in certain instances, but in some instances it may be advantageous to maintain more uniformity in the conditioned compressed air flow that has also had a level of choke adjusted. Consequently, the inventors have also recognized that the present invention can be used to decouple choke adjustment from an overall swirl adjustment during operation of the gas turbine engine.

An overall swirl is a level of swirl in the compressed air flow resulting from a combination of flow conditioning paths that may have different local swirls. For example, in uniformly adjustable airfoil configurations of the prior art, each of the flow conditioning paths may develop its own local swirl. When combined these local swirls form an overall swirl. Uniform adjustment of the airfoils always adjusts all local swirls simultaneously and proportionally. In embodiments of the instant invention, when as few as two airfoils are adjusted relative to an adjacent airfoil, the overall swirl can be increased if both adjusted airfoils are rotated further in the same direction as the remaining airfoils. In this case the increase in local swirls will increase an overall swirl. Likewise the overall swirl can be decreased if both adjusted airfoils are rotated back in the opposite direction as the remaining airfoils. In this case the decrease in local swirls will decrease the overall swirl. In order to adjust choke without adjusting a level of swirl, one airfoil can for example be adjusted in an opposite direction as another adjusted airfoil. In this case the change in the local swirls in the flow conditioning paths adjacent the first adjusted airfoil are canceled by the change in the local swirls in the flow conditioning paths adjacent the second adjusted airfoil, and so the overall swirl remains the same while the overall degree of chocking is changed.

In further embodiments all of the airfoils may be adjusted, but at least one may be individually adjusted differently, to permit independent adjustment of the level of choke and the level of swirl. For example but not meant to be limiting, to increase a choke but maintain a constant swirl, all of the airfoils may be rotated such that a first group of every other airfoil rotates in one direction and a second group of the remaining airfoils rotate a same amount in the opposite direction. This increases a level of choking yet maintains a constant amount of swirl. In between configurations where only two airfoils are adjusted and where all the airfoils are adjusted are a plethora of configurations where any number of airfoils less than all of the airfoils is adjusted. This enables many configurations where choke and swirl can be adjusted independently of each other by manipulation the resultant configuration of the airfoils, all of which are considered to be within the scope of this disclosure.

In addition to controlling choke and swirl, a flow conditioning device may serve an additional function where it acts as a fuel stage. In many combustion designs a benefit is achieved by adding an additional fuel injection stage at a location upstream of the combustor head end. The amount of fuel injected through this stage is maintained to less than the flammability limit. In conventional combustion designs, this stage is configured as a fuel ring that is disposed within a compressed air flow as part of a flow sleeve or as part of a portal. The present inventors have recognized that these configurations lack control over the fuel distribution at the head end of the combustor. Fuel distribution impacts dynamic performance of the combustor, so the lack of control of the fuel distribution may negatively impact the dynamic performance of the combustor.

Embodiments of the present invention may include a separate upstream fuel stage that is consolidated into a flow conditioner so that the flow conditioner conditions flow, controls a level of choke, and acts as a fuel stage. Various configurations are possible. For flow conditioning device embodiments that use plate configurations, one flow directing element may have as few as one injector associated with a single opening. On the other end of the spectrum there may be as many injectors as there are openings such that each flow conditioning path may have its own injector. In yet another variation, a plate may have more than one injector for some or all of the openings. Furthermore, one plate or more than one plate may have openings with an injector or a plurality of injectors associated with it.

For flow conditioning device embodiments that use airfoils, there may be as few as one injector associated with one airfoil, or multiple airfoils may be associated with injectors. There may be as few as one injector associated with one flow conditioning path, or there may be multiple injectors for single flow path(s). For example, there may be as few as one injector associated with a single airfoil and associated with a single flow conditioning path. Likewise there may be a plurality of injectors associated with each flow conditioning element and each flow conditioning path. An example embodiment may provide for one or more airfoils with a plurality of associated injectors, where individual injectors may be associated with different flow directing paths. Different flow conditioning paths may be one path on a first side of the airfoil, and another on a second side of the airfoil. Turning to the figures, FIG. 1 shows a combustion system 10 including a combustor 12 and a transition 14. Compressed air indicated by arrow 16 flows around the combustion system 10 enroute to a combustor head end 18. In an upstream region 20 the compressed air 16 travels in a direction opposite that of combustion gasses within the combustion system 10. In a turning region 22 the compressed air starts and completes a turn of approximately 180 degrees for entry to a head end region 24 immediately upstream of the combustor head end 18. Some gas turbine engine designs may effectively have no head end region 18. In that case the compressed air 16 enters the combustor 12 immediately upon completing the turn. A flow conditioning device may be disposed in any of the upstream region 20, the turning region 22, and/or the head end region 24. In embodiments where more than one flow conditioning device is used, the flow conditioning devices may be in the same or different regions.

Figure 2:
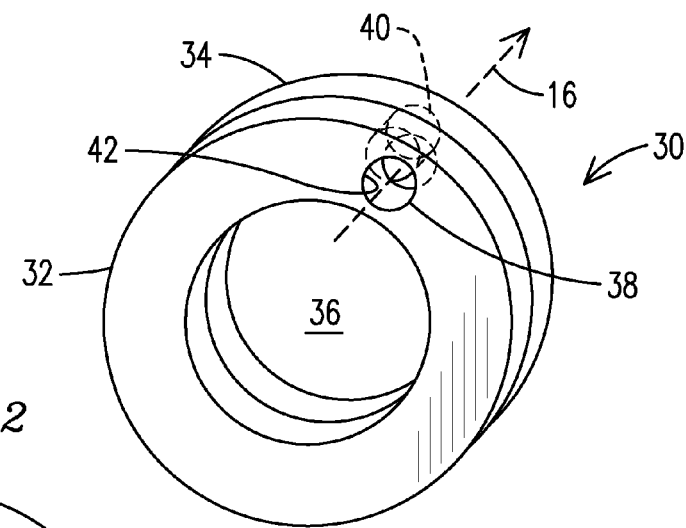
FIGS. 2-4 show various embodiments of flow conditioning devices.

As seen in FIG. 2, a flow conditioning device 30 comprising plates and configured to be disposed in an annular upstream region 20 may appear as a first annular plate 32 and a second annular plate 34 defining a combustor opening 36 in which the combustion system 10 (not shown) is disposed. More than two plates may be utilized in other embodiments to provide additional degrees of control over chocking, swirl and fuel distribution. The first annular plate 32 may include a first annular plate opening 38 and the second annular plate may include a second annular plate opening 40. The first plate annular plate opening 38 and the second annular plate opening 40 associate with each other to form a flow conditioning path 42 there through. There may be as few as one flow conditioning path 42 (as illustrated) and there may be as many as will fit within the structural confines of the first annular plate 32 and the second annular plate 34.

In operation a flow of compressed air 16 flows through the flow conditioning path 42. Choking is accomplished by rotating either the first annular plate 32 with respect to the second annular plate 34, the second annular plate 34 with respect to the first annular plate 32, or both the first annular plate 32 and the second annular plate 34 with respect to each other. Such rotation changes the flow conditioning path 42 such that it will allow more or less compressed air through the cooperating openings 38, 40, depending on the direction of relative rotation. In embodiments where, for example, both openings are round, relative rotation of the plates also changes a cross sectional shape of the flow conditioning path 42. The amount of compressed air that will flow through can be determine from a hydraulic diameter of the flow conditioning path 42, which essentially determines an equivalent circular diameter for a non circular flow path. As relative rotation reduces the flow of compressed air, the hydraulic diameter decreases, and vice versa. Other shapes of openings are also envisioned, including but not limited to parallelograms, ovals, curved ovals, wedges, etc. While a single pair of cooperating round holes 38, 40 are used for illustration, one skilled in the art will appreciate that a plurality of opening pairs more evenly distributed about the circumference of the device would likely provide a more evenly distributed flow pattern to the downstream combustor 12.

Figure 3:
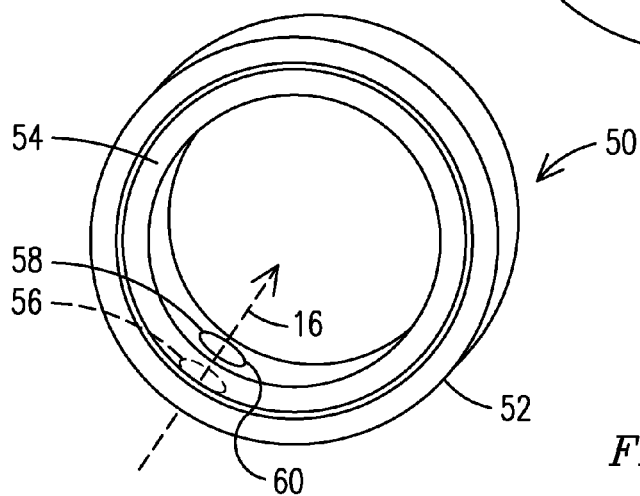

As seen in FIG. 3, a flow conditioning device 50 comprising plates and disposed in the turning region 22 may appear as a first plate 52 and a second plate 54, each formed into an annular shape and associated with each other to resemble concentric squirrel cages that appear to be an extension of the combustor (not shown). More than two plates may be utilized as well. The first plate 52 may include a first plate opening 56 and the second plate 54 may include a second plate opening 58. The first plate opening 56 and the second plate opening 58 associate with each other to form a flow conditioning path 60 there through. There may be as few as one flow conditioning path 60 and there may be as many as will fit within the confines of the first plate 52 and the second plate 54.

In operation, a flow of compressed air 16 flows through the flow conditioning path 60. Choking is accomplished by rotating either the first plate 52 with respect to the second plate 54, the second annular plate 54 with respect to the first annular plate 52, or both the first annular plate 52 and the second annular plate 54 with respect to each other. Such rotation changes the flow conditioning path 60 such that it will allow more or less compressed air through, depending on the direction of relative rotation. As above, in embodiments where both openings are round, relative rotation of the plates also changes a cross sectional shape of the flow conditioning path 60. The amount of compressed air that will flow through can be determined from a hydraulic diameter of the flow conditioning path 60. Other shapes of openings are also envisioned, including but not limited to parallelograms, ovals, curved ovals, wedges, etc.

Figure 4:
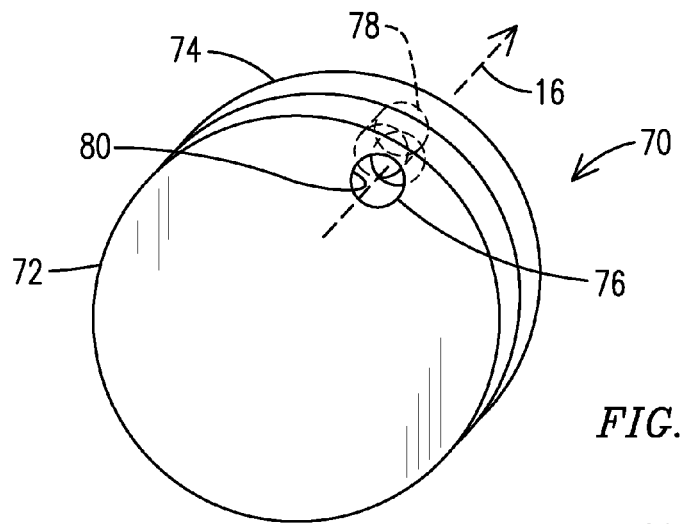

As seen in FIG. 4, a flow conditioning device 70 formed as plates and disposed in the head end region 24 may appear as a disc shaped first plate 72 and a disc shaped second plate 74. More than two plates may be utilized. The disc shaped first plate 72 may include a disc shaped first plate opening 76 and the disc shaped second plate 74 may include a disc shaped second plate opening 78. The disc shaped first plate opening 76 and the disc shaped second plate opening 78 associate with each other to form a flow conditioning path 80 there through. There may be as few as one flow conditioning path 80 and there may be as many as will fit within the confines of the disc shaped first plate 72 and the disc shaped second plate 74.

In operation, a flow of compressed air 16 flows through the flow conditioning path 80. Choking is accomplished by rotating either the disc shaped first plate 72 with respect to the disc shaped second plate 74, the disc shaped second plate 74 with respect to the disc shaped first plate 72, or both the disc shaped first plate 72 and the disc shaped second plate 74 with respect to each other. Such rotation changes the flow conditioning path 80 such that it will allow more or less compressed air through, depending on the direction of relative rotation. As above, in embodiments where both openings are round, relative rotation of the plates also changes a cross sectional shape of the flow conditioning path 60. The amount of compressed air that will flow through can be determined from a hydraulic diameter of the flow conditioning path 80. Other shapes of openings are also envisioned, including but not limited to parallelograms, ovals, curved ovals, wedges, etc.

Figure 5:
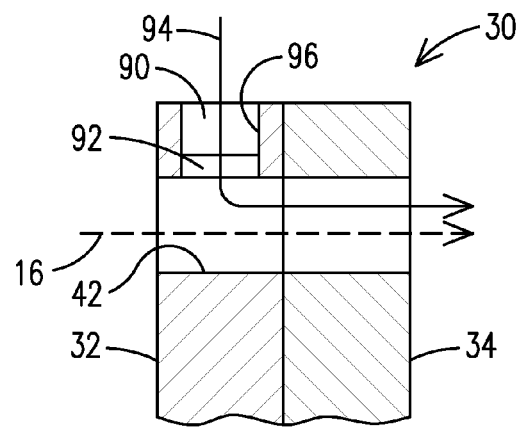
FIG. 5 shows a cross section of the flow conditioning device of FIG. 2.

As seen in FIG. 5, which is a cross section of the flow conditioning path 42 of FIG. 2, a fuel passage 90 and an associated fuel injector 92 may be associated with the flow conditioning path 42 such that fuel 94 may be injected into the flow conditioning path 42. The fuel 94 may be injected at any angle to the flow of compressed air 16, including parallel to the flow of compressed air 16, at an oblique angle to the flow of compressed air 16, and perpendicular to the flow of compressed air 16. There may be one, more than one, or no fuel injectors 92 associated with any given flow conditioning path 16. Consequently, the flow conditioning device 30 may range from having no fuel injectors 92, to having multiple fuel injectors 92 for each flow conditioning path 42. It can also be seen that in the embodiment shown, an inner surface 96 of the first annular plate 32 defines at least part of the fuel passage 90. Various configurations are possible, including those where inner surface 96 and a surface of the second annular plate 34 together define a flow passage 90. Further, it is envisioned where fuel passage 90 may be a separate conduit that leads to a fuel injector 92 associated with the flow conditioning path 42.

Figure 6:
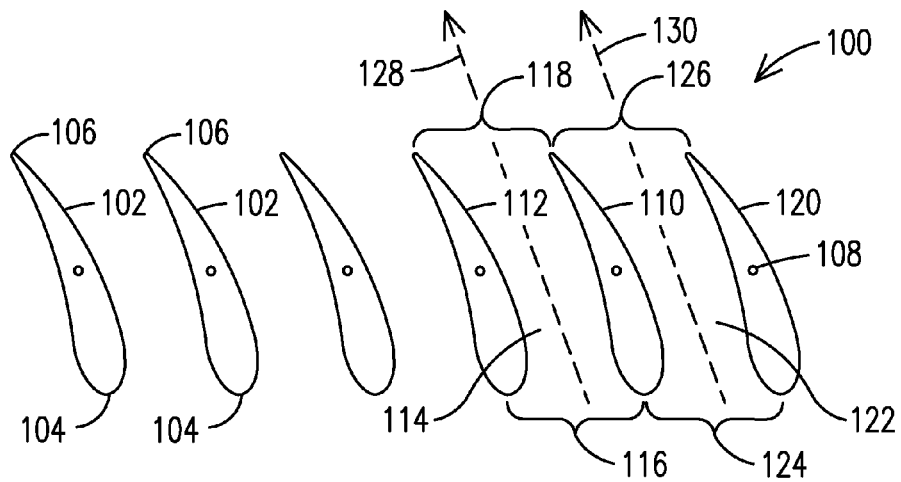
FIGS. 6-12 show various embodiments of flow conditioning devices.

FIG. 6 is a schematic representation of a flow conditioning device 100 comprising airfoils 102 disposed in the upstream region 20 and in a pre-adjustment configuration. The view is an end view of each of the airfoils 102, but straightened to permit a flat representation. FIG. 6 can also be used to represent a flow conditioning device 100 disposed in the head end region 24 because in both cases they work under the same principles, the primary difference being whether they are disposed outward or inward of the combustor wall. Each airfoil has an upstream end 104, a downstream end 106, and a pivot point 108, which may be an axis onto which the airfoil 102 is secured. For any given airfoil 110, the given airfoil 110 and a first adjacent airfoil 112 collectively form a first flow conditioning path 114 including a first upstream opening 116 and a first downstream opening 118. The given airfoil 110 and a second adjacent airfoil 120 collectively form a second flow conditioning path 122 including a second upstream opening 124 and a second downstream opening 126. A first compressed air flow 128 flows through the first flow conditioning path 114 and a second compressed air flow 130 flows through the second flow conditioning path 122. In this embodiment, the pivot points 108 are spaced equally apart circumferentially, are spaced at the same axial location (with respect to the flow), and are positioned at approximately the middle of the airfoils 102 with respect to a cord length of the airfoils 102. In various embodiments, the pivot points 108 need not be circumferentially equally spaced, need not be equally axially positioned, and may be at any position along a cord length of the airfoils 102. Any or all of these parameters may be different from one airfoil 102 to another. Further, a shape and cord length of the airfoils 102 may vary as desired.

Figure 7:
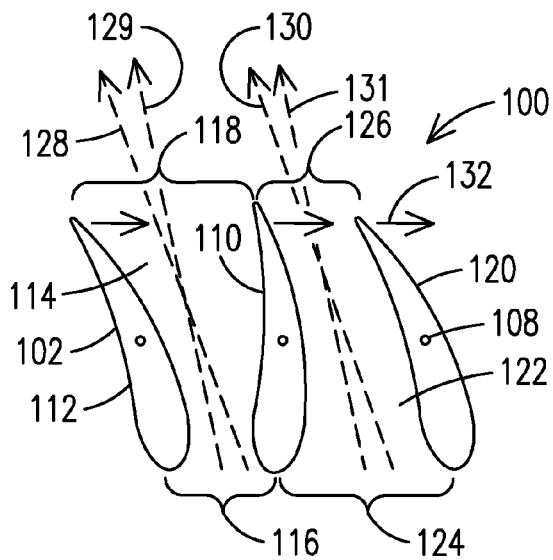

In operation, as few as one given airfoil 110 may be moved relative to the first adjacent airfoil 112 and the second adjacent airfoil 120. FIG. 7 depicts one post adjustment configuration of the airfoils 102 if the movement of the given airfoil 110 is clockwise. It can be seen that a size of the first upstream opening 116 decreases and a size of the first downstream opening 118 increases. This shifts a direction of the first compressed air flow 128 clockwise to 129, which decreases the first compressed air flow's swirl. Likewise, a size of the second upstream opening 124 increases and a size of the second downstream opening 126 decreases, and this shifts a direction of the second compressed air flow 130 clockwise to 131, which decreases the second compressed air flow's swirl. In the first flow conditioning path 114 the decrease in size of the first upstream opening 116 decreases a flow rate of the first compressed air flow 128. Likewise, in the second flow conditioning path 122 the decrease in size of the second downstream opening 126 decreases a flow rate of the second compressed air flow 130. Thus, in this configuration a level of choking has been increased, and a level of overall swirl has been decreased.

In an embodiment where only one given airfoil 110 is adjusted, the local swirls will be adjusted, and thus the overall swirl will also be adjusted. In an embodiment where as few as two airfoils 102 are adjusted, one could be adjusted as shown in FIG. 7, and a second could be adjusted in an opposite direction. The change in the level of choking would be determined be the amount of movement of the airfoils 102, but by alternating the direction of the movement, the decrease in local swirls related to one adjusted airfoil 102 would be countered by the increase in local swirls related to the oppositely adjusted airfoil 102. Thus, the level of choking would be increased and the level of swirl would remain the same.

Also visible in FIG. 7 are flows of injected fuel 132. These may emanate from one, some, or all of the airfoils 102. There may be a single injected fuel flow 132 for any given airfoil 110, there may be multiple injected fuel flows 132 for any given airfoil 110, or there may be no injected fuel flow 132 for any given airfoil 110. Likewise, there may be a single injected fuel flow 132 for any flow conditioning path 114, 122, there may be multiple injected fuel flows 132 for any flow conditioning path 144, and there may be any combination. On one end of the range there may be no injected fuel flows, and at the other end of the range there may be plural fuel flows 132 from each airfoil 102 for each flow conditioning path 114, 122. Any combination as desired is possible.

Figure 8:
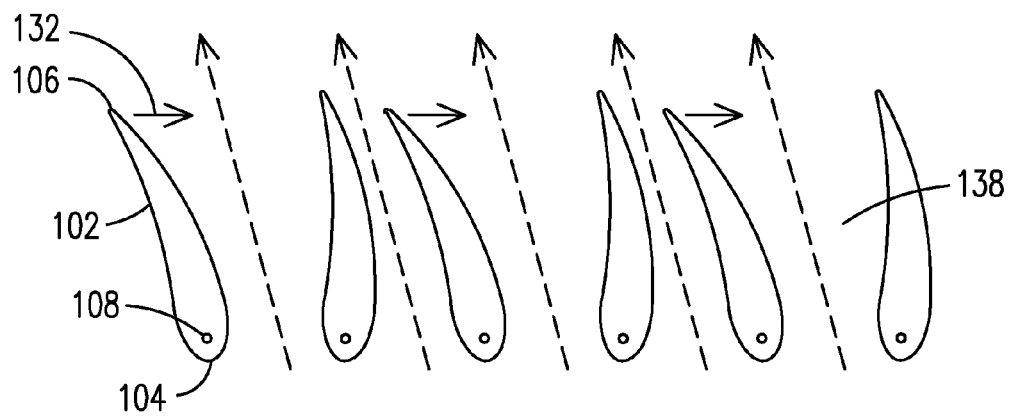
Figure 9:
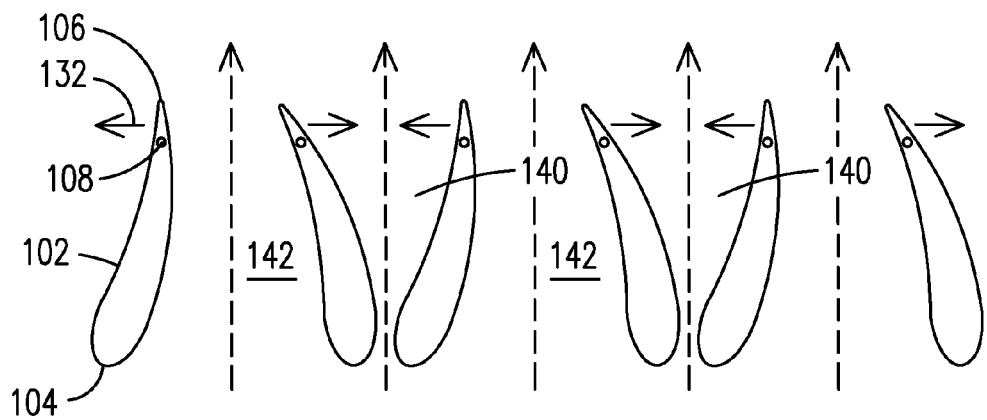

Any number of the airfoils 102 can be made to be individually adjustable in the same manner as the given airfoil 110. As a result, any number of post adjustment configurations is possible. Just a few post adjustment configurations are schematically illustrated in FIGS. 8-9. For example, FIG. 8 illustrates a configuration where the pivot points 108 are equally circumferentially spaced, equally axially positioned, and positioned at an upstream end 104 of each of the airfoils 102. In this configuration a first half of the airfoils 102 have taken a first orientation with respect to a second half of the airfoils 102 in a second orientation. In this configuration an overall swirl can be maintained. In this embodiment, every other airfoil 102 produces an injected fuel flow 132 into the flow conditioning path 138 in a region where turbulence is more likely, in order to increase mixing of the fuel into the compressed air flow.

FIG. 9 illustrates a configuration where the pivot points 108 are not equally circumferentially spaced, are equally axially positioned, and are positioned at a downstream end 106 of each of the airfoils 102. In this configuration a first half of the airfoils 102 have taken a first orientation with respect to a second half of the airfoils 102 in a second orientation. In this configuration an overall swirl can be eliminated. In this embodiment, the airfoils 102 inject two fuel flows into every other flow conditioning path 140 and no fuel flow into intervening flow conditioning paths 142.

Figure 10:
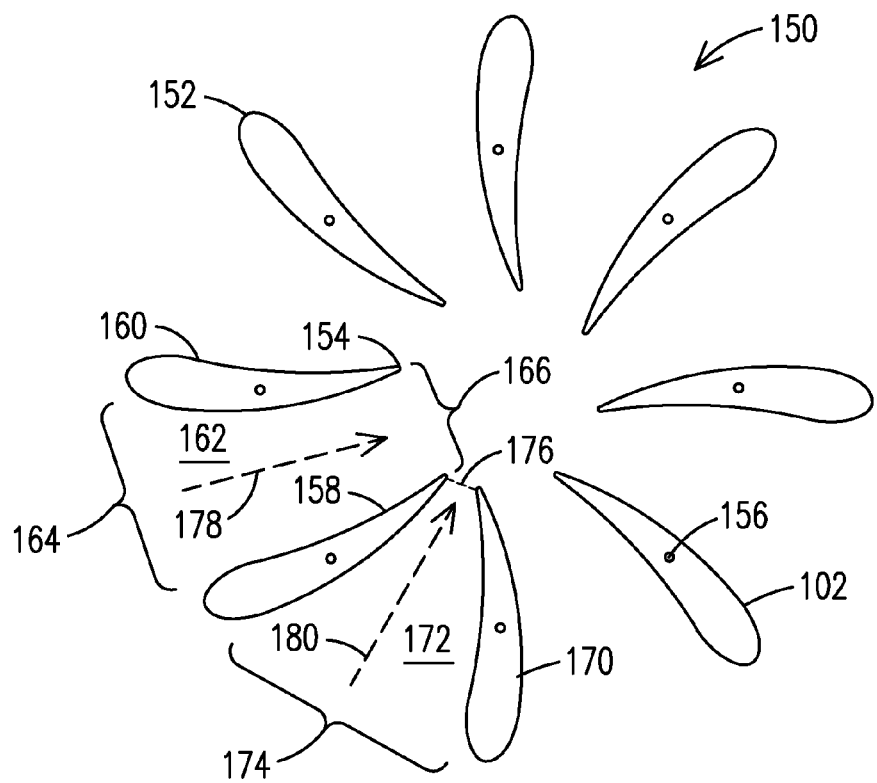

FIG. 10 is a schematic representation of a flow conditioning device 150 including airfoils 102 disposed in the turning region 22 and in a post-adjustment configuration. The view is an end view of each of the airfoils 102 looking downstream through a combustor (not shown). Each airfoil has an upstream end 152, a downstream end 154, and a pivot point 156, which may be an axis onto which the airfoil 102 is secured. For any given airfoil 158, the given airfoil 158 and a first adjacent airfoil 160 collectively form a first flow conditioning path 164 including a first upstream opening 164 and a first downstream opening 166. The given airfoil 158 and a second adjacent airfoil 170 collectively form a second flow conditioning path 172 including a second upstream opening 174 and a second downstream opening 176. A first compressed air flow 178 flows through the first flow conditioning path 162 and a second compressed air flow 180 flows through the second flow conditioning path 172. In this embodiment, the pivot points 108 are spaced equally apart circumferentially and are positioned at approximately the middle of the airfoils 102 with respect to a cord length of the airfoils 102. In various embodiments, the pivot points 108 need not be circumferentially equally spaced and may be at any position along a cord length of the airfoils 102. Any or all of these parameters may be different from one airfoil 102 to another. Further, a shape and cord length of the airfoils 102 may vary as desired.

Similar to FIG. 7, in this configuration it can be seen that a size of the first upstream opening 164 decreases and a size of the first downstream opening 166 increases when solely the given airfoil 158 is rotated clockwise. This shifts a direction of the first compressed air flow 178 clockwise, which decreases the first compressed air flow's swirl. Likewise, a size of the second upstream opening 174 increases and a size of the second downstream opening 176 decreases, and this shifts a direction of the second compressed air flow 180 clockwise, which decreases the second compressed air flow's swirl. In the first flow conditioning path 162 the decrease in size of the first upstream opening 164 decreases a flow rate of the first compressed air flow 178. Likewise, in the second flow conditioning path 172 the decrease in size of the second downstream opening 176 decreases a flow rate of the second compressed air flow 180. Thus, in this configuration a level of choking has been increased, and a level of overall swirl has been decreased.

Figure 11:
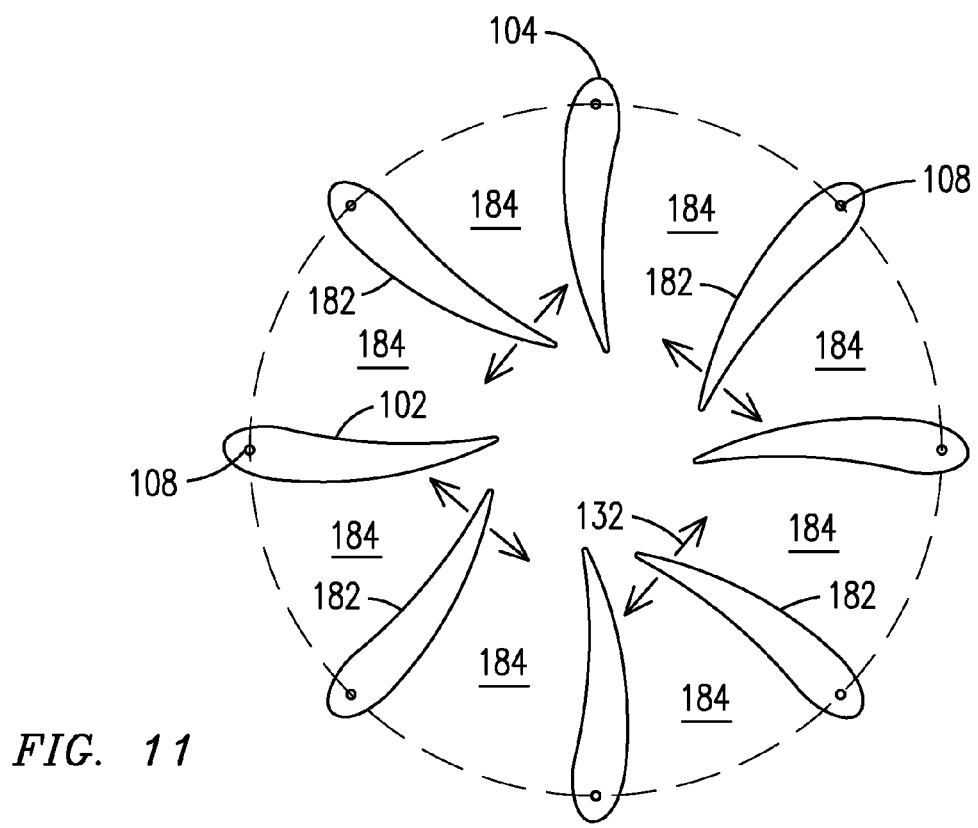
Figure 12:
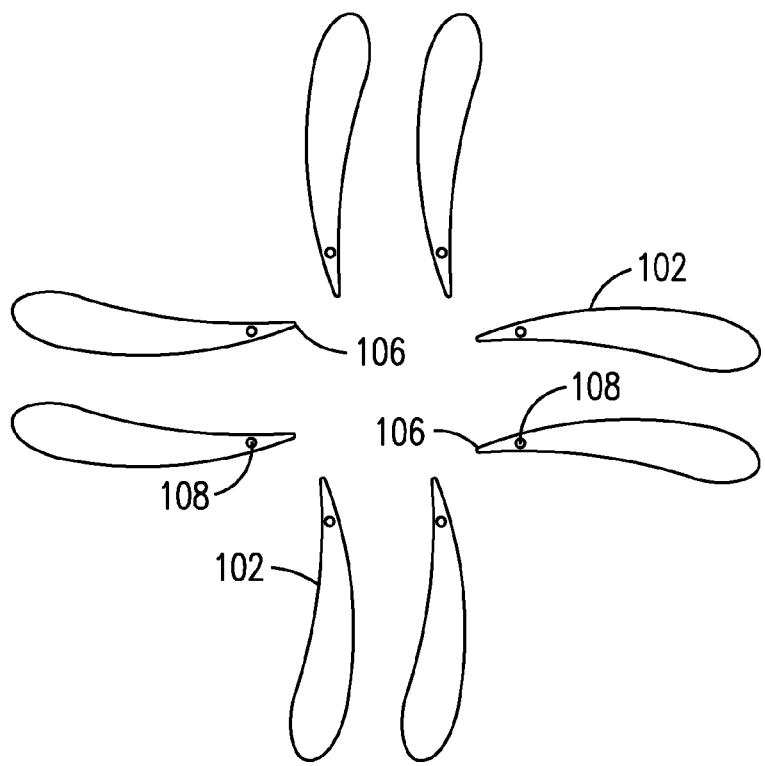

Any number of the airfoils 102 can be made to be individually adjustable in the same manner as the given airfoil 158. As a result, any number of post adjustment configurations is possible. Just a few post adjustment configurations are schematically illustrated in FIGS. 11-12. For example, FIG. 11 illustrates a configuration where the pivot points 108 are equally circumferentially spaced, and positioned at an upstream end 104 of each of the airfoils 102. In this configuration a first half of the airfoils 102 have taken a first orientation with respect to a second half of the airfoils 102 in a second orientation. In this configuration an overall swirl can be maintained. In this embodiment, every other airfoil 182 produces two injected fuel flows 132, one for each flow conditioning paths 184 adjacent to the every other airfoil 182.

FIG. 12 illustrates a configuration where the pivot points 108 are equally circumferentially spaced and are positioned at a downstream end 106 of each of the airfoils 102. In this configuration a first half of the airfoils 102 have taken a first orientation with respect to a second half of the airfoils 102 in a second orientation. In this configuration an overall swirl can be eliminated.

Figure 13:
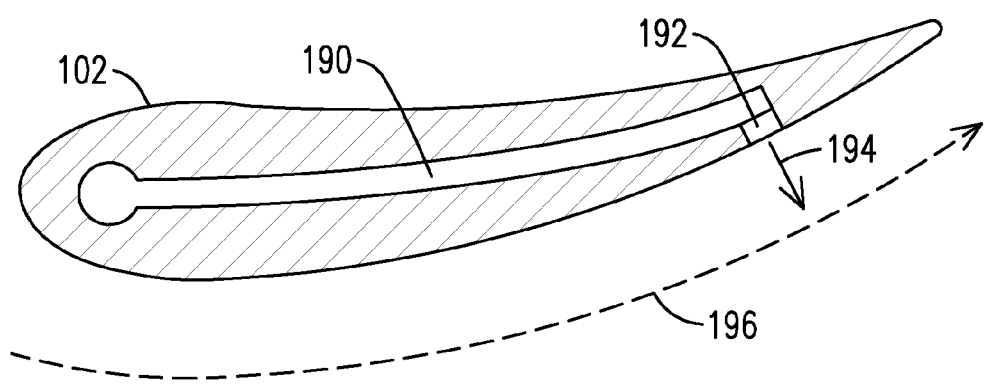
FIG. 13 shows a cross section of the flow conditioning device of FIG. 6.

FIG. 13 is a cross section of an airfoil 102 comprising a fuel passage 190 and an associated fuel injector 192 configured to inject fuel 194 into a flow of compressed air 196. The fuel 194 may be injected at any angle to the flow of compressed air 196, including parallel to the flow of compressed air 196, at an oblique angle to the flow of compressed air 16, and perpendicular to the flow of compressed air 196. There may be one, more than one, or no fuel injectors 192 associated with any particular airfoil 102. Consequently, the flow conditioning device may range from having no fuel injectors 192, to having multiple fuel injectors 192 for each airfoil 102. It is also envisioned that the fuel passage 190 may be a separate conduit that leads to a fuel injector 192 associated with the airfoil 102.

Figure 14:
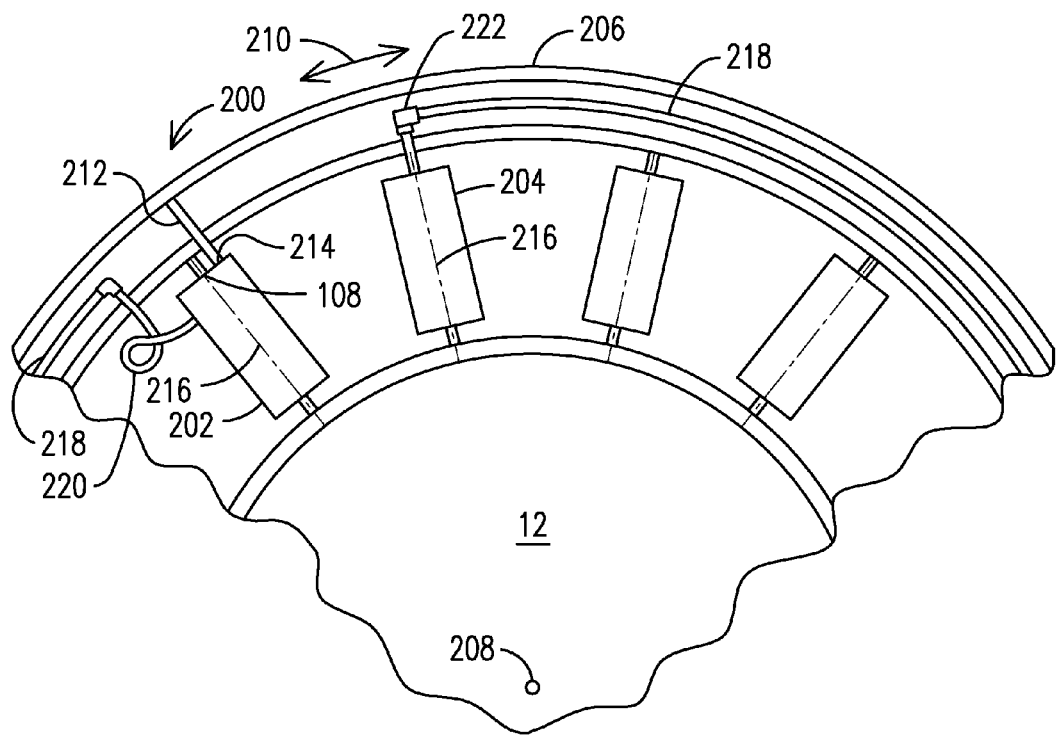
FIG. 14 shows a cross section of an adjustment mechanism.
Figure 15:
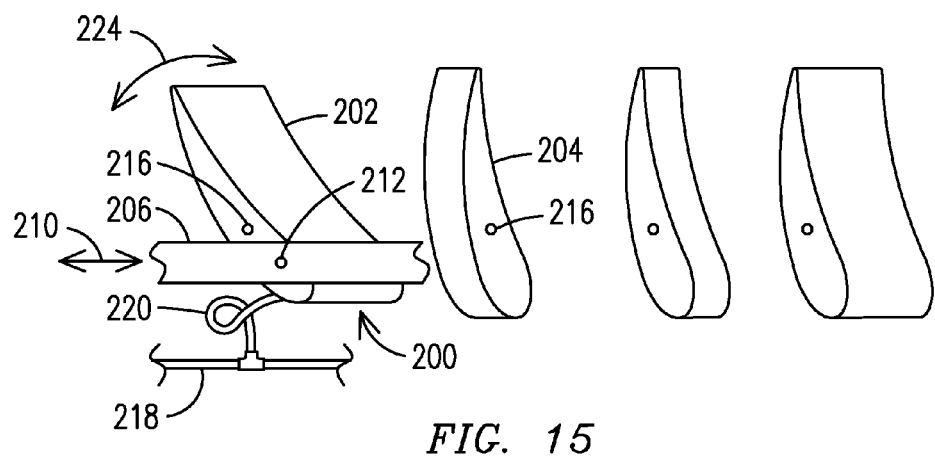
FIG. 15 shows the adjustment mechanism of FIG. 14 looking radially inward.

FIG. 14 discloses an exemplary embodiment of a mechanism 200 for adjusting a first airfoil 202 or group of airfoils independently from a second airfoil 204 or group of airfoils. FIG. 14 shows the mechanism 200 as though viewed looking axially downstream as seen by a flow of compressed air. In the exemplary embodiment shown the airfoils are disposed the upstream region 20, radially outward of a combustion chamber 12. The mechanism 200 may include an adjusting ring 206 disposed concentric with the longitudinal axis 208 of the combustion assembly. The adjusting ring 206 may be free to move in a circumferential direction 210. An adjustment link 212 secures the first airfoil 202 to the adjustment ring 206. The adjustment link 212 is connected to the first airfoil 202 at a link connection point 214 at a location other than the pivot point 108 through which a pivot axis 216 of the first airfoil 202 passes. Fuel may be supplied to the first airfoil 202 via a fuel lead 218 that includes a flexible fuel connection 220 leading to the first airfoil 202. The flexible fuel connection 220 can accommodate any relative movement of the first airfoil 202. In an alternate exemplary embodiment, a fuel lead 218 may supply a rotatable fuel connection 222 centered about the pivot axis 216 so fuel may be supplied despite any rotation of a blade. FIG. 15 shown a partial view of the mechanism of FIG. 14 from a radially outward position looking radially inward showing the adjusting ring 206, the adjustment link 212, the first airfoil 202, the second airfoil 204, circumferential movement 210, fuel lead 218, and the flexible fuel connection 220. Movement of the adjusting ring 206 circumferentially 210 moves the adjustment link 212, which in turn pivots the first airfoil 202 about the pivot axis 216, producing rotation 224 of the first airfoil 202. It can be seen that this movement is independent of the second airfoil 204. The mechanism 200 may take several configurations. The mechanism may include one adjusting ring 206 for each airfoil. In such an exemplary embodiment each airfoil may be individually adjusted as desired with respect to all remaining airfoils. There may be as few as one adjusting ring 206, where the sole adjusting ring 206 is connected to some but not all of the airfoils. In such an exemplary embodiment movement of the adjusting ring 206 would adjust the connected airfoils, but the remaining airfoils would not move. There may also be configurations where airfoils are broken into subgroups, with an adjusting ring 206 for each subgroup. In such an exemplary embodiment movement of each adjusting ring would adjust the respective airfoils relative to the other airfoil groups. Any combination of the above is also considered within the scope of the invention. Further, with little modification this mechanism 200 may be applied to airfoils disposed at the turning region 22, and/or the head end region 24, and/or plates 32, 34, 52, 54, 72, 74.

The present inventors have devised a unique but straightforward device that conditions a flow of compressed air enroute to a combustor, while also permitting control of a level of choking of the flow of compressed air and independent control of a level of local and overall swirls in the compressed air. As a result, aspects of operation of the gas turbine engine can be controlled in a manner not before possible. In addition, the device can also act as a fuel stage, further enhancing control and consolidating parts and space. Embodiments of the invention would require linkages configured to allow an operator to make the above-described movements of the flow conditioning devices during operation of the gas turbine engine. Such linkages may include mechanical devices such as push rods, bell cranks, gears or other means for providing linear and/or rotational movement such as are well known to one skilled in the art of gas turbine engine design.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A flow conditioning device for a can annular gas turbine engine, comprising:
    a plurality of flow directing elements disposed in a compressed air flow path lead-ing to a combustor; and
    the plurality of flow directing elements configured for relative adjustment of at least one flow directing element with respect to an adjacent flow directing element during operation of a gas turbine engine effective to adjust a level of choking of the compressed air flow path; and
    wherein the plurality of flow directing elements further comprise a plurality of annular plates, wherein each of the plurality of annular plates has a top surface, a bottom surface and a perimeter, wherein each of the plurality of annular plates comprises at least one opening through the top surface and bottom surface, wherein the openings are associated with each other to establish at least one flow conditioning path through the plurality of annular plates, and wherein rotation of one annular plate with respect to another adjusts a size of the at least one flow conditioning path.

2. The flow conditioning device of claim 1, configured such that adjustment of the at least one flow directing element during operation of the gas turbine engine is effective to increase the level of choking of the compressed air flow path without increasing a level of swirl in a compressed air flow through the compressed air flow path.

3. The flow conditioning device of claim 1, wherein the plurality of annular plates are disposed adjacent one another and radially outward of a combustion assembly comprising the com-bustor and a transition duct.

4. The flow conditioning device of claim 1, wherein the plurality of annular plates are disposed proximate a combustor inlet head end.

5. The flow conditioning device of claim 1, comprising a fuel injector associated with at least one of the flow directing elements.

6. A flow conditioning device for a can annular gas turbine engine, comprising:
    a plurality of annular plates disposed in a compressed air flow path leading to a combustor and adjacent one another along a direction of flow, wherein each of the plurality of annular plates has a top surface, a bottom surface and a perimeter, wherein each of the plurality of annular plates comprises at least one opening through the top surface and bottom surface; wherein the at least one opening of each of the plurality of annular plates are associated with each other to establish at least one flow conditioning path through the plurality of annular plates; and
    wherein rotation about a common axis of one plate with respect to another adjusts a hydraulic diameter of the least one flow conditioning path during operation of the can annular gas turbine engine.

7. The flow conditioning device of claim 6, wherein a surface of at least one plate defines at least part of a fuel path, and the fuel path leads to a fuel injector associated with the at least one flow conditioning path.

8. A flow conditioning device for a can annular gas turbine engine, comprising:
    a plurality of flow directing elements disposed in a compressed air flow path lead-ing to a combustor; and
    the plurality of flow directing elements configured for relative adjustment of at least one flow directing element with respect to an adjacent flow directing element during operation of a gas turbine engine effective to adjust a level of choking of the compressed air flow path; and
    wherein the flow directing elements further comprise a plurality of annular plates having the same shape, wherein each of the plurality of annular plates comprises at least one opening, wherein the openings are associated with each other to establish at least one flow conditioning path through the plurality of annular plates, and wherein rotation of one annular plate with respect to another adjusts a size of the least one flow conditioning path.

* * * * *